(12) United States Patent
Klinghult

(10) Patent No.: US 7,495,652 B2
(45) Date of Patent: Feb. 24, 2009

(54) POINTING DEVICE ENABLING MEANS, INPUT DEVICE AND PORTABLE DEVICE INCORPORATING SAME

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 393 days.

(21) Appl. No.: 10/511,573

(22) PCT Filed: Apr. 16, 2003

(86) PCT No.: PCT/EP03/03974

§ 371 (c)(1),
(2), (4) Date: Oct. 13, 2004

(87) PCT Pub. No.: WO03/091934

PCT Pub. Date: Nov. 6, 2003

(65) Prior Publication Data

US 2005/0228320 A1 Oct. 13, 2005

Related U.S. Application Data

(60) Provisional application No. 60/377,090, filed on May 2, 2002.

(30) Foreign Application Priority Data

Apr. 23, 2002 (EP) .................................. 02445051

(51) Int. Cl.
G09G 5/00 (2006.01)
(52) U.S. Cl. ........................ 345/156; 345/157; 345/167; 341/33

(58) Field of Classification Search ................. 345/167, 345/156, 157, 163, 173, 184; 713/323, 321, 713/310; 341/33, 34; 178/18.01, 18.03, 178/18.06
See application file for complete search history.

(56) References Cited

U.S. PATENT DOCUMENTS 6,058,485 A * 5/2000 Koziuk et al. ............... 713/320
6,269,449 B1 7/2001 Kocis (Continued)

FOREIGN PATENT DOCUMENTS

EP 0 052 685 6/1982

(Continued)

*Primary Examiner*—Sumati Lefkowitz
*Assistant Examiner*—Seokyun Moon
(74) *Attorney, Agent, or Firm*—Renner, Otto, Boisselle & Sklar, LLP

(57) ABSTRACT

The invention relates to means for enabling actuation of a pointing device and more particularly a means for detecting activity of a pointing device, so that the pointing is energized only when it needs to be in operation. The means include an activity sensor for sensing activation of the pointing device, said activity sensor comprising a threshold comparator, wherein the activity sensor is adapted to enable energization of the pointing device when the sensed activation of the pointing device exceeds a threshold. The pointing device is used for moving a pointer or prompt in a display, e.g. in mobile telephone. The present invention also relates to an input device with such a pointing device and a portable device incorporating same. The invention is directed to saving energy in portable devices avoiding accidental activation of the pointing device and automatic switching off to reduce the power consumption.

13 Claims, 2 Drawing Sheets

U.S. PATENT DOCUMENTS

| | | |
|---|---|---|
| 6,282,655 B1 | 8/2001 | Given |
| 6,567,677 B1 * | 5/2003 | Sokoloff .................. 455/575.1 |
| 6,583,784 B1 * | 6/2003 | Helmbrecht ................ 345/167 |
| 6,661,410 B2 * | 12/2003 | Casebolt et al. ............. 345/173 |
| 6,703,599 B1 * | 3/2004 | Casebolt et al. ............. 250/221 |

FOREIGN PATENT DOCUMENTS

| | | | |
|---|---|---|---|
| EP | 0463856 A2 * | | 6/1991 |
| EP | 0 910 006 | | 4/1999 |
| EP | 1 073 004 | | 1/2001 |
| EP | 1073004 | * | 1/2001 |
| GB | 2 276 261 | | 9/1994 |
| GB | 2 279 750 | | 1/1995 |
| WO | WO-89/02635 | | 3/1989 |
| WO | WO-00/20959 | | 4/2000 |

* cited by examiner

POINTING DEVICE ENABLING MEANS, INPUT DEVICE AND PORTABLE DEVICE INCORPORATING SAME

This patent application claims the benefit of priority from U.S. Provisional Patent Application Ser. No. 60/377,090, filed on May 2, 2002.

FIELD OF THE INVENTION

The present invention relates to means for enabling actuation of a pointing device and more particularly a means for detecting activity of a pointing device, so that the pointing device is energized only when it needs to be in operation. The pointing device is used for moving a pointer or prompt in a display, e.g. in mobile telephone. The present invention also relates to an input device with such a pointing device and a portable device incorporating same. The invention is directed to saving energy in portable devices avoiding accidental activation of the pointing device and automatic switching off to reduce the power consumption.

STATE OF THE ART

WO 00/20959 describes a capacitive switch for a pointing device. The pointing device has an input mechanism and a touch sensor actuating a power switch when touched by a user. The pointing device may be a track ball and the touch sensor is an annual ring around the track ball allowing the user to hold the device and not actuate the power switch. When the user is ready to use the device, as indicated by placing a hand or digit near the track ball, the touch sensor activates the switch to provide power to the input mechanism.

However, when such an input mechanism is incorporated in a portable device, such as a mobile telephone that is often put in a pocket or a purse, problems arise. The input device should not be activated when accidentally touching the portable device in or near the pocket. Also, the input device should be switched off after a time has elapsed without any sensed activation of the pointing device. This is especially important in a mobile environment since the power source, usually a rechargeable battery or the like, has a limited charge.

The present invention solves the above-mentioned problems by providing means for enabling actuation of the pointing device, including means comparing the activity sensed by the sensor, such that the pointing device is not enabled unless the sensed activity exceeds a threshold.

SUMMARY OF THE INVENTION

According to a first aspect, the invention provides a means for enabling actuation of a pointing device, including an activity sensor for sensing activation of the pointing device, said activity sensor comprising a threshold comparator, wherein the activity sensor is adapted to enable energization of the pointing device when the sensed activation of the pointing device exceeds a threshold.

According to a second aspect, the invention provides an input device comprising a pointing device and an activity sensor for sensing activation of the pointing device, wherein said activity sensor comprises a threshold comparator, and the activity sensor is adapted to enable energization of the pointing device when the sensed activation of the pointing device exceeds a threshold.

According to a third aspect, the invention provides a portable device including a display for showing menus in which navigation may be performed by means of such an input device.

The portable device may be a mobile telephone,

BRIEF DESCRIPTION OF THE DRAWINGS

The invention will be described in detail below with reference to the accompanying drawings in which.

DETAILED DESCRIPTION OF PREFERRED EMBODIMENTS

As mentioned in the introduction, the invention relates to an input device especially for mobile telephones and other portable equipment. The input device comprises a pointing device for navigating back and forth in menus shown in a display of the portable device. The pointing device may include a track ball or jog ball, which is turned by a finger. Joy sticks and other button mechanisms are also possible.

One main concern in portable devices is that the power consumption should be as low as possible since their battery reserve is limited. Thus, the sensors sensing the movement of the pointing device should not be energized all the time and inadvertent activation should be avoided. For instance a mobile telephone is often carried in pockets and a pointing device may easily be activated unintentionally when walking or fingering on other objects carried in the same pocket. The energization of the pointing device should also be switched off as soon as possible whether the activation was unintentional or an intentional activation is terminated.

Figure 1:
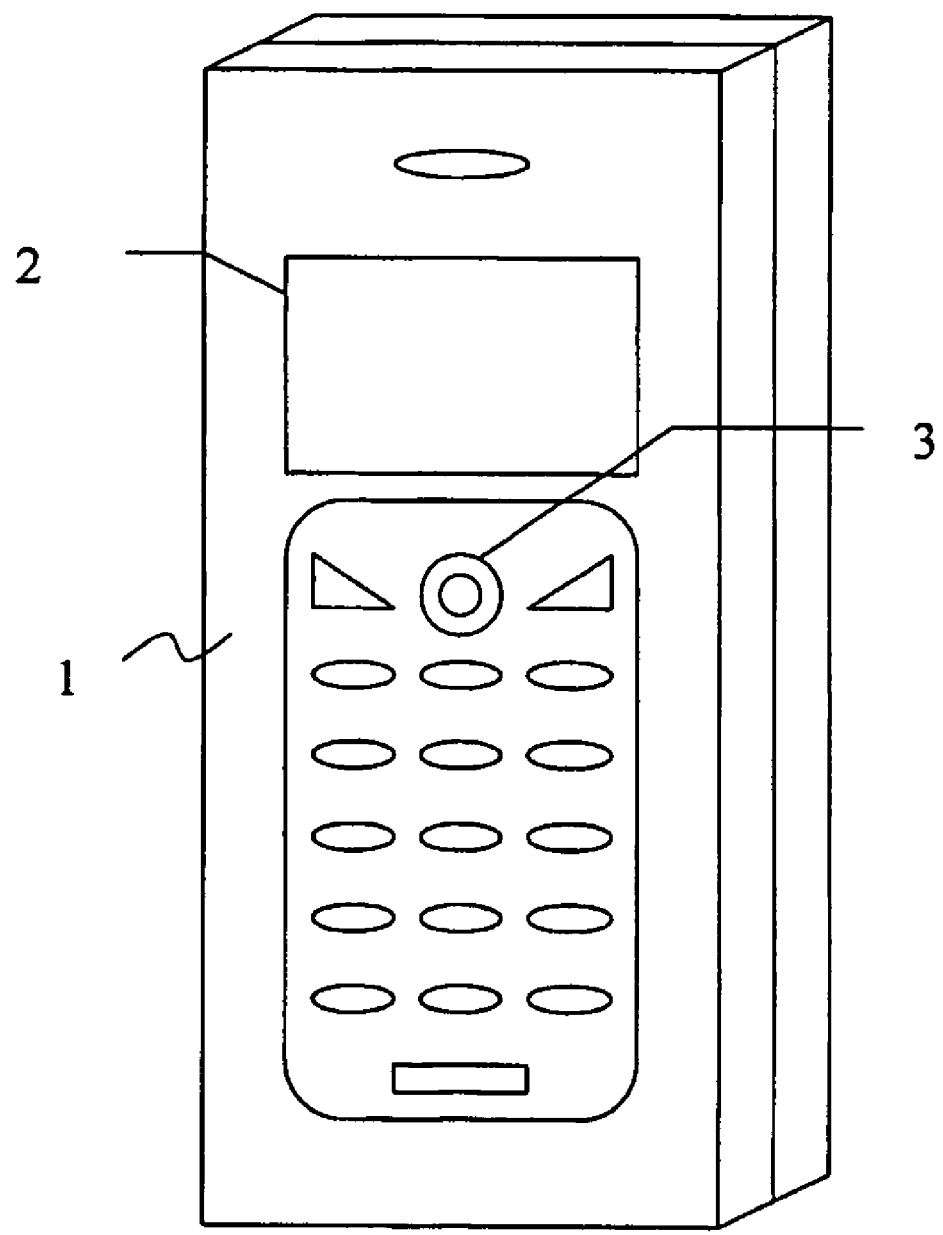
FIG. 1 is a general view of a mobile telephone incorporating an embodiment of the invention.

In FIG. 1, a general mobile telephone 1 is shown. The telephone comprises a display 2 for showing menus including text and pictures. The user may navigate in the menus using a pointing device 3, in this case a jog ball.

Figure 2:
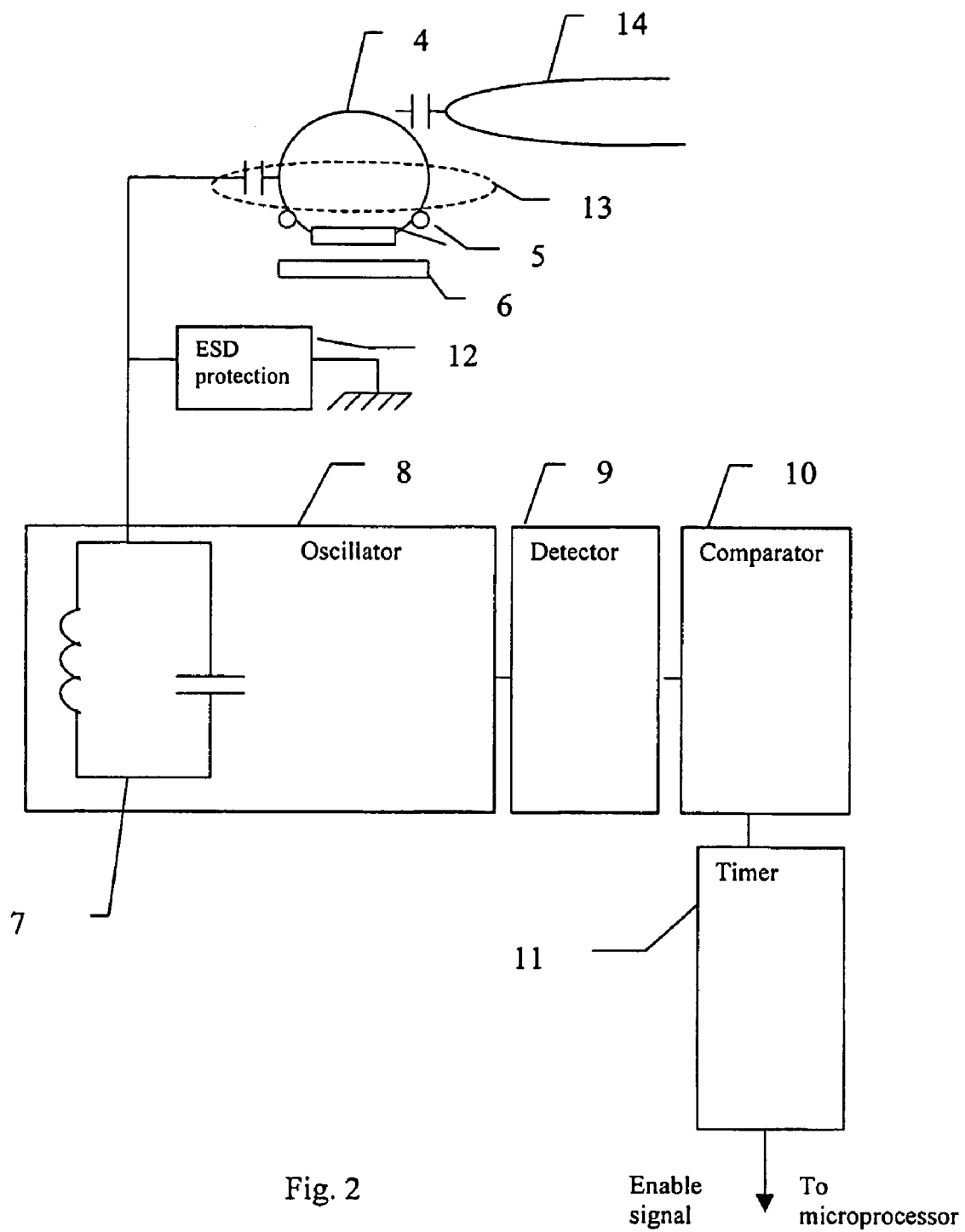
FIG. 2 is a block diagram of the pointing device and associated circuitry.

In FIG. 2 is shown a jog ball and associated circuitry of the input device. The pointing device comprises a ball 4, which may be rolled in all directions. The ball 4 forms part of a capacitor and must comprise material carrying charges. The ball should have an electric conducting shell as near the outer surfaces as possible. However, due to the capacity sensing principle the outer surfaces could be of electric non-conducting material like plastic or rubber. This capacity solution also makes it possible to start the system when a user is wearing not too thick gloves. In one embodiment the ball is a plastic ball with a metallized layer which in turn is coated by another layer of plastic.

The ball is lying on four rolls 5 made of a magnetic material. As the ball 4 is moved the rolls 5 will also be turned. The movement of the rolls 5 is in turn sensed by a number of Hall element sensors, each placed in the vicinity of each roll e.g. on a circuit board 6 located underneath the ball 4. The Hall element sensors will give electric signals as output. For clarity not all the details of the suspension of the ball 4 are shown here, but may be of a conventional design. Also, other motion sensing means are possible.

The problem is the current consumption of the Hall element sensors. Normally one sensor uses 5-10 mA of current each. This is too much for use in a mobile telephone or other portable device, if the Hall element sensors are energized at all times.

The solution is that the Hall element sensors are only energized when necessary, preferably in combination with capacitive sensing of the activation of the ball. The ball 4 is connected to an activity sensor sensing when the ball is moved or approached by a finger. The activity sensor comprises an oscillator 8 with a resonant circuit 7, here an LC circuit but may also be an RC circuit, a detector 9, a comparator 10 and a timer 11. To protect the activity sensor an ESD (Electrostatic Discharge) protection unit 12 may be provided.

The resonant circuit 7 of the oscillator 8 is capacitively connected to the ball 4 by means of an antenna or pick-up 13 surrounding the ball 4. The capacitance of the pick-up 13 determines the idle frequency of the resonant circuit together with the capacitance and inductance of the resonant circuit itself. When a user approaches a ball 4 with his finger 14 the capacitance between the finger and the ball will change the capacitance of the total resonant circuit 7. The finger does not actually have to touch the ball with physical contact. On account of the presence of the finger the capacitance is increased. This change of capacitance will change the frequency of the oscillator. The frequency change is detected by the detector 9.

The activity sensor only needs continuous current in the microampere (μA) range which is acceptable in a mobile device.

Another advantage of the capacitive sensing arrangement is that the pick-up 13 is not mechanically connected to the ball 4. This means that there is no wear on the pick-up or ball which otherwise could result in contact failure and other problems.

The signal from the detector may be used to wake up the system energizing the Hall element sensors. However, in order not to wake up the system inadvertently the output signal of the detector is supplied to the comparator 10. If the signal falls below a threshold, no enabling signal is output and the system remains inactive.

Preferably, the signal from the comparator is passed through a timer system 11. If the signal output from the detector exceeds a threshold, the system is activated and the timer is reset and started. If no activity or movement of the ball is sensed when the timer has reached a certain elapsed time value, the system is deactivated again.

Both the comparator threshold and the timer value may be adjusted by the user. This gives the user the possibility to personalise the operation modes of the device so that he can avoid that the system is switched off too quickly or too often, in dependence of the actual situation in which the device is used.

In an alternative embodiment the resonant circuit, the oscillator and detector are replaced by a high impedance amplifier (not shown).

Thus, the present invention enables power to be saved in portable devices. No delay will be introduced in the system, as it would be in a sampled system. The term "portable device" includes portable radio equipment such as mobile telephones, pagers, communicators, electronic organizers, smart phones and the like. The scope of the invention is only limited by the claims below.

The invention claimed is:

1. An input device comprising:
   a pointing device that includes a user-manipulable member that is moveable with a finger of a user and the user-manipulable member having a conductive part covered by a non-conductive cover;
   an activity sensor for sensing activation of the pointing device, wherein the activity sensor comprises:
   a detector device for sensing a capacitance change in the pointing device;
   a threshold comparator connected to receive an output of the detector device; and
   a resonant circuit that is capacitively coupled to the conductive part of the user-manipulable member by a member disposed with respect to the user-manipulable member, the resonant circuit having a frequency that changes when a finger of a user approaches or touches the user-manipulable member by establishment of a capacitance between the finger and the conductive part; and
   wherein the detector device detects the capacitance change by detecting the change in frequency of the resonant circuit and an output of the threshold comparator activates movement sensing of the user-manipulable member; and
   a movement sensor that senses movement of the user-manipulable member and outputs a pointing command signal in response to sensed movement of the user-manipulable member; and
   wherein the activity sensor is adapted to enable energization of the movement sensor when the sensed activation of the pointing device exceeds a threshold, and the activity sensor further comprises a timer adapted to switch off the energization of the movement sensor after a time has elapsed without any sensed activation of the pointing device.

2. The device according to claim 1, wherein the threshold is adjustable.

3. The device according to claim 1, wherein the time is adjustable.

4. The device according to claim 1, wherein the detector device comprises a high impedance amplifier.

5. The device according to claim 1 further comprising:
   a display for showing menus in which navigation is performed by means of the input device.

6. The device according to claim 5, wherein the device is a mobile telephone.

7. The device according to claim 1, wherein the user-manipulable member is a ball.

8. The device according to claim 7, wherein the ball is a metallized plastic ball with a plastic or rubber coating.

9. The device according to claim 7, wherein the detector device further comprises an oscillator with the resonant circuit, wherein a capacitance of the ball forms a part of the resonant circuit.

10. The device according to claim 7, wherein the conductive part is a metallized layer that covers a core of the ball and the metallized layer is covered by the non-conductive cover.

11. The device according to claim 1, wherein the member disposed with respect to the user-manipulable member is an antenna.

12. The device according to claim 1, wherein the member disposed with respect to the user-manipulable member is spaced apart from the non-conductive cover.

13. The device according to claim 1, wherein the movement sensor is one or more Hall element sensors.

* * * * *